United States Patent
Bock et al.

(10) Patent No.: US 6,437,783 B1
(45) Date of Patent: Aug. 20, 2002

(54) METHOD AND SYSTEM FOR SIMULTANEOUSLY DISPLAYING THE THROUGHPUT ON MULTIPLE BUSSES

(75) Inventors: Anthony S. Bock, Vancouver, WA (US); Mason B. Cabot, Portland, OR (US); Rick L. Coulson, Portland, OR (US); Frank T. Hady, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/394,993

(22) Filed: Sep. 13, 1999

(51) Int. Cl.[7] .................. G06T 11/20; G06T 11/30; H02H 3/05
(52) U.S. Cl. .................. 345/440; 702/182; 714/39
(58) Field of Search .................. 702/179, 182, 702/186; 709/224; 324/600–627, 76.11, 76.12, 76–99; 714/39; 345/440, 440.1, 440.2

(56) References Cited

U.S. PATENT DOCUMENTS

| | | | | |
|---|---|---|---|---|
| 3,588,837 A | * | 6/1971 | Rash et al. | 702/182 |
| 3,708,657 A | * | 1/1973 | Kelling | 318/603 |
| 3,895,343 A | * | 7/1975 | Farr | 367/190 |
| 4,176,402 A | * | 11/1979 | Sipple | 714/39 |
| 4,290,010 A | * | 9/1981 | Blaess et al. | 324/620 |
| 4,445,221 A | * | 4/1984 | Reynolds et al. | 375/213 |
| 4,974,598 A | * | 12/1990 | John | 600/509 |
| 5,142,673 A | * | 8/1992 | De Angelis et al. | 714/39 |
| 5,282,213 A | * | 1/1994 | Leigh et al. | 702/79 |
| 5,581,482 A | * | 12/1996 | Wiedenman et al. | 702/186 |
| 5,621,664 A | * | 4/1997 | Phaal | 345/418 |
| 5,633,801 A | * | 5/1997 | Bottman | 702/65 |
| 5,793,976 A | * | 8/1998 | Chen et al. | 370/252 |
| 5,809,450 A | * | 9/1998 | Chrysos et al. | 702/186 |
| 5,850,388 A | * | 12/1998 | Anderson et al. | 370/252 |
| 5,903,730 A | * | 5/1999 | Asai et al. | 709/224 |
| 5,913,043 A | * | 6/1999 | Carter et al. | 710/100 |
| 6,000,044 A | * | 12/1999 | Chrysos et al. | 714/47 |
| 6,016,080 A | * | 1/2000 | Zuta et al. | 331/25 |
| 6,182,247 B1 | * | 1/2001 | Herrmann et al. | 714/39 |
| 6,275,782 B1 | * | 8/2001 | Mann | 702/182 |
| 6,298,315 B1 | * | 10/2001 | Li et al. | 702/180 |

* cited by examiner

Primary Examiner—Jeffery Brier
Assistant Examiner—Ryan Yang
(74) Attorney, Agent, or Firm—Kenyon & Kenyon

(57) ABSTRACT

A method and system are disclosed for measuring simultaneously and at randomly distributed intervals throughputs sets on one or more busses under test and displaying the percent occurrences of those throughputs sets in a graph as a density function. A method and system are also disclosed for simultaneously measuring throughput sets on one or more busses under test given that user specified stimuli are input into those busses and displaying those throughput sets in a graph as concurrency plots.

27 Claims, 7 Drawing Sheets

METHOD AND SYSTEM FOR SIMULTANEOUSLY DISPLAYING THE THROUGHPUT ON MULTIPLE BUSSES

BACKGROUND OF THE INVENTION

I. Field of the Invention

This invention relates generally to system performance and more specifically to measuring and displaying throughputs on multiple busses.

II. Background Information

In a computer system, the bus is used to move information between devices. A bus defines a pathway for signals to flow between devices in the computer. Examples of busses include, among others, the system memory bus, the processor bus, the Accelerated Graphics Port ("AGP" Version 2.0, 1998) (a dedicated high-speed bus directly between the chipset and the graphics controller), and the Peripheral Component Interconnect ("PCI" Version 2.2, 1998) bus (bus attaching a wide variety of input and output devices, such as disk controllers, local area network chips, and video capture systems).

Computer systems also contain a chipset. The chipset controls traffic between multiple busses that need to access the same device. Chipsets also perform the function of figuring out which location is being addressed in either the random access memory ("RAM") or the read-only memory and then commanding the corresponding chips, single inline memory module, or dual inline memory module to supply the information at that location. Devices such as system memory can only service a certain number of requests at a time, therefore, the chipset schedules and orders requests from multiple busses to ensure that the device is accessed efficiently. The strength of a chipset is measured by how quickly the chipset services requests from multiple busses vying for access to a device such as memory.

Emerging applications that provide arcade-quality graphics, interactive three dimensional ("3D") reference titles, interactive video, and exhilarating 3D data visualization impose a host of rigorous requirements on the computer system, including more detailed texturing. Texturing allows the creation of lifelike surfaces and shadows within the 3D image. In the past, complex graphics data, such as texture maps which are stored in the system memory, had to travel to the graphics controller over the PCI bus. Thus, as complex graphics data, such as texture maps, have grown in size (a single texture map can be in of 20 MB), the PCI bus became a bottleneck.

The AGP is a new port designed to relieve graphics bottlenecks by adding a new dedicated high-speed interconnect directly between the chipset and the graphics controller. This removes bandwidth-intensive 3D and video traffic from the constraints of the PCI bus. While the PCI bus supports a maximum of 132 MB/s, the AGP at 66 MHZ supports a maximum of 533 MB/s.

In addition new chipsets, such as the Intel® 440BX chipset, have improved throughputs between the central processing unit, the AGP, system memory, and the PCI bus by combining enhanced bus arbitration, deeper buffers, and improved memory control. The new chipsets allow for faster servicing of requests from high throughput devices such as Graphics Controllers utilizing the AGP.

Current techniques for displaying throughputs are cumbersome and difficult to decipher. They generally measure throughputs sequentially, rather than at randomly distributed intervals, and graph these throughput measurements against time. Current techniques do not simultaneously display the throughput on more than one bus. These techniques do not adequately demonstrate that application programs such as 3D graphics and full-motion video require huge amounts of data and thus require devices such as the AGP. In such cases, the AGP can increase the overall throughput by removing 3D and video traffic from the slower PCI bus thus freeing it up. By freeing up the slower PCI bus, the AGP allows high-speed devices attached to the PCI bus to get the devices' requests serviced quicker.

At the present time, there exists no means of directly measuring or visualizing a chipset's ability to manage high volumes of input/output traffic. Those seeking chipset performance information are forced to rely on system level benchmarks, which inadequately showcase high performance chipsets and are dependent on many system parameters other than the performance of the chipset. Existing benchmarks rely on commercially available applications to generate system loads. These benchmarks are too light (i.e., the traffic generated by the benchmark to the chipset is too light) to stress the performance of advanced chipsets and seldom include more than one type of concurrent chipset contention (i.e., may include memory contention but does not also include processor bus contention). Thus, the chipset's concurrent abilities remain largely unused and unmeasured when using a contemporary benchmark test.

Also, existing benchmarks are flawed because they measure the performance of the system as a whole with a large number of external variables, such as video card and disk speed, affecting the results as much or more than the chipset. Thus, the results from a contemporary benchmark typically vary little from one chipset to the next, as chipset performance is only a minor fraction of the overall "score" reported by these programs. This problem increases when current bench marking methods are applied to chipsets with strong concurrent abilities that allow for maximum use of the AGP's efficient data transfer modes.

For these reasons, there is a need to simultaneously and at randomly distributed intervals measure and display the throughputs on one or more busses in order to graphically visualize the load an application presents to a system. There is also a need to simultaneously measure and display the throughputs on one or more busses in order to show a chipset's ability to maintain high throughputs simultaneously to the various system agents (such as the AGP or the PCI bus) under test. In addition, the performance capabilities of a chipset need to be throughly exercised in order to differentiate between weak chipsets and chipsets with advanced concurrent capabilities.

SUMMARY OF THE INVENTION

According to an embodiment of the present invention, a method is disclosed for displaying a density function. That method entails measuring signal sets simultaneously and at randomly distributed intervals on the busses under test, analyzing those signal sets to determine the percent occurrences of the signal sets, and displaying those percent occurrences in a graph.

DETAILED DESCRIPTION

I. Overview

Figure 1:
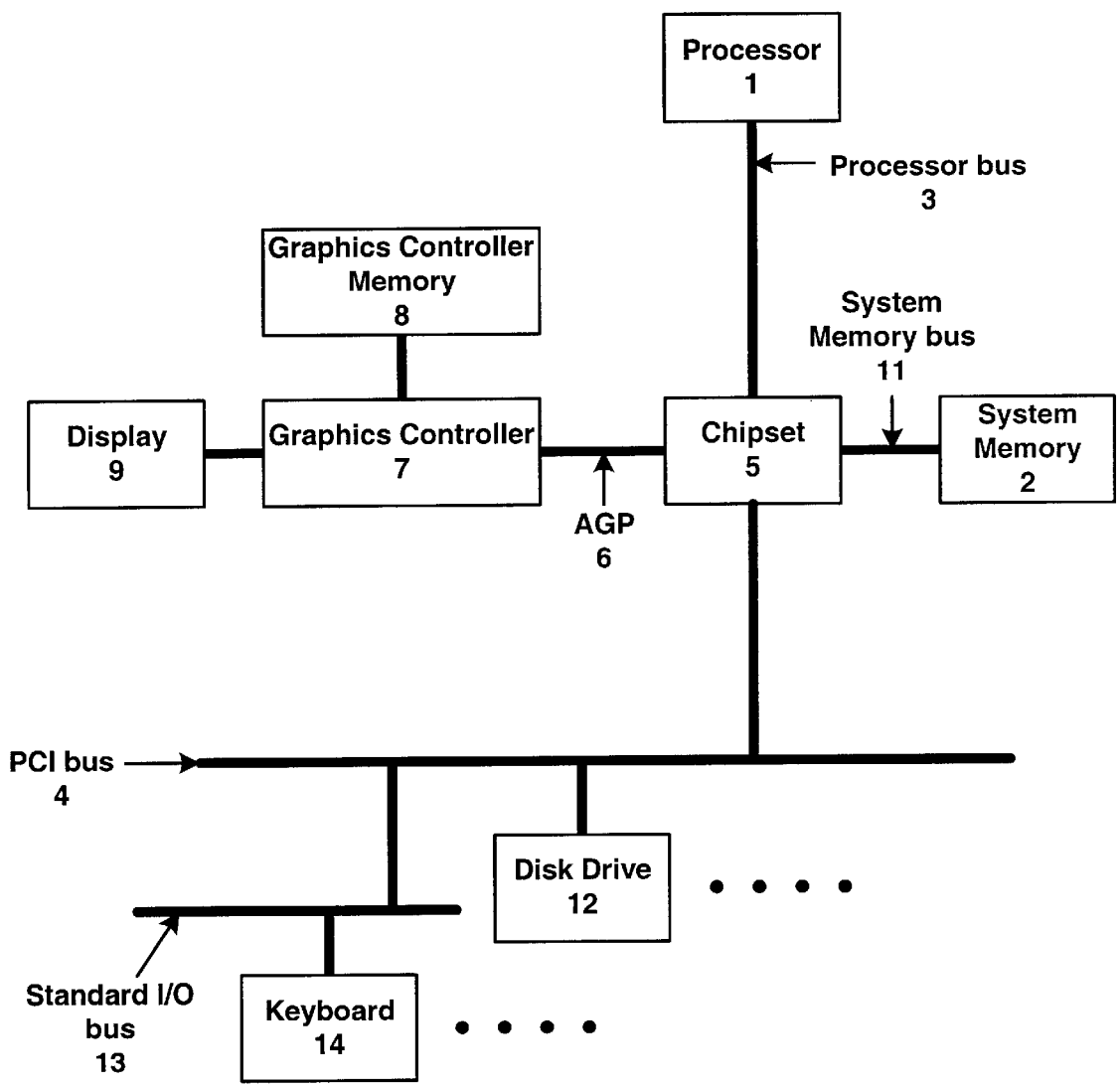
FIG. 1 is a block diagram illustrating a computer system according to an embodiment of the present invention.

Current techniques for displaying the throughputs on busses measure throughputs as sequential time samples and graph these samples against time. Current techniques also do not display a chipset's ability to manage high volumes of input/output traffic. By taking simultaneous and randomly distributed throughput measurements on one or more busses, and then simultaneously displaying those throughputs as a density function, the following benefits are realized: (1) allows rapid determination of characteristics of an application such as the concurrent load it presents to the system; (2) allows rapid comparison of the throughputs presented by different applications; (3) visually describes the effects on throughput when various algorithmic techniques such as AGP texturing are executing; (4) allows application programmers to easily determine if the application is efficient in its use of various devices; (5) allows the characteristics of long runtime applications to be plotted without having to create a large, unwieldy trace; and (6) possibly demonstrates the need for devices such as the AGP.

Density function as used herein, refers to displaying the percent occurrences of throughput sets where different colors signify different percent occurrences of the throughput sets. Set as used herein, refers to at least one of the item.

By inputting user specified stimuli into one or more busses under test and simultaneously measuring throughputs on those busses, and then displaying those throughputs as a concurrency plot, the following benefits are realized: (1) allows stressing different devices or stressing a given device in a different way since the user can specify the characteristics of the input stimulus; (2) allows for accurate measurement of the chipset's concurrent abilities without having external variables, such as video card and disk speed, affecting the results; (3) allows for meaningful comparison between basic chipsets and those with enhanced concurrent capabilities; and (4) allows chipset architects to rapidly pick out possible problems in a chipset and advantages of one chipset over another.

Concurrency plot as used herein, refers to a curve where each data point on that curve represents a simultaneous measurement of the throughputs on the busses under test given that user specified stimuli are input into those busses. Busses under test as used herein, refers to the busses involved in the test, as specified by the user, and whose throughputs will be simultaneously measured.

In an embodiment of the present invention, logic analyzers measure the throughputs on one or more busses. As an application is executing, simultaneous and randomly distributed throughput measurements are taken on the busses under test. The percent occurrences of the throughputs are calculated and these values are displayed in a graph as a density function. In this embodiment of the invention, user specified stimuli are input into the busses under test. The chipset's ability to service these stimuli are found by simultaneously measuring the throughputs on the busses under test and then simultaneously displaying these throughputs in a graph as concurrency plots.

Signal measurements include measurements such as bus utilization and throughput. Throughput refers to the amount of work that can be performed by a component in a given period of time. Signal sets, as used herein, refer generally to the set of signal measurements obtained by simultaneously measuring the signals on the busses under test. Throughput sets, as used herein, refer specifically to the set of throughput measurements obtained by simultaneously measuring the throughputs on the busses under test. The number of throughput measurements in each throughput set depends on the number of busses involved in the test. For example, if two busses are involved in the test then each throughput set will contain two throughput measurements, the two throughput measurements being the simultaneous measurement of the throughput on each of the two busses under test.

Referring to the figures in which like numerals indicate like elements, FIG. 1 is a block diagram illustrating a computer system 10 according to an embodiment of the present invention. Computer system 10 includes a processor 1 which executes instructions and controls the operation of computer system 10. Processor 1 may be, for example, a Pentium® II processor available from Intel Corporation. Computer system 10 also contains a system memory 2 where data and programs are stored. A processor bus 3 is used to connect processor 1 to other components of computer system 10. A system memory bus 11 is used to connect system memory 2 to other components of computer system 10. A PCI bus 4 connects processor 1 to a wide variety of input/output ("I/O") devices such as a disk drive 12. Disk drive 12 is an electromechanical device that reads from and writes to disks.

Computer system 10 includes a chipset 5 which includes electronic circuits needed to transfer information from one part of the computer to another, and AGP 6 which provides a high-speed pathway between a graphics controller 7 and system memory 2. Graphics controller 7 grabs data from system memory 2 and formats it for later output to a display 9. A graphics controller memory 8 is used by graphics controller 7 to store data such as texture data in order to create lifelike surfaces and shadows within the 3D image. A keyboard 14 allows the user to communicate with computer system 10. Keyboard 14 is connected to computer system 10 using a standard I/O bus 13. Finally, a display 9 is used to visually show output from computer system 10.

II. Displaying the Throughputs from an Application Program

Figure 2:
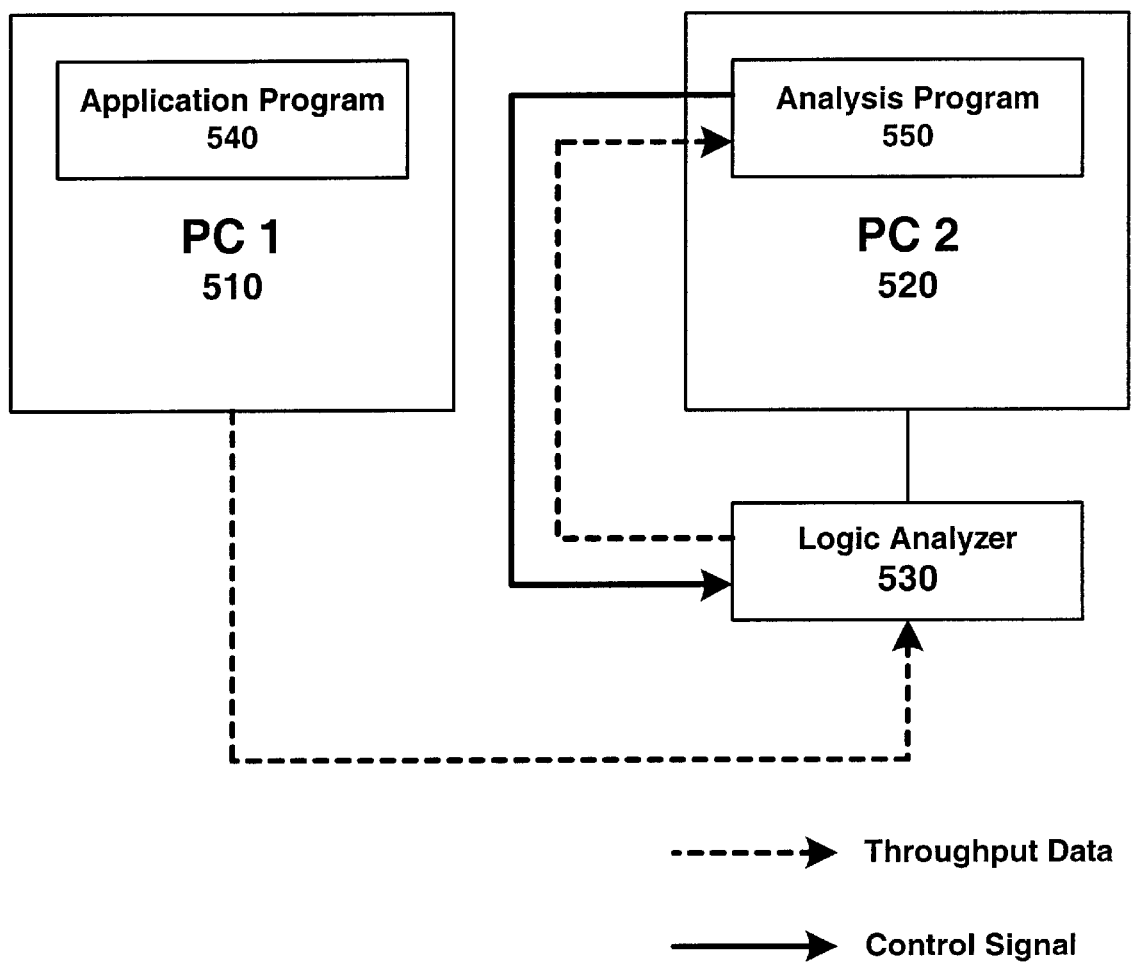
FIG. 2 is a block diagram illustrating the setup required to display a density function for a particular application program.

FIG. 2 is an example of an embodiment for a setup to graphically display the throughputs measured on one or more busses under test. A first computer system, PC1 510, is running an application program 540 which presents a load to the busses under test. An analysis program 550 runs on PC2 520. Analysis program 550 directs a logic analyzer 530 to measure a throughput set, gathers the measured throughput sets, and graphs a density function based on the measurements. Logic analyzer 530 is connected to a second computer system, PC2 520. The probes of logic analyzer 530 are attached to any of the system busses such as AGP 6, PCI bus 4, and processor bus 3. Examples of logic analyzer 530 are the Hewlett-Packard® 16550A 100 MHZ logic analyzer or the Tektronix® TLS 216 logic analyzer.

With regards to the control and throughput data signals in FIG. 2, analysis program 550 sends a control signal to logic analyzer 530 in order to direct logic analyzer 530 to clear its trace memory and also to direct logic analyzer 530 to measure a throughput set. Throughput set data is collected by logic analyzer 530 from any of the busses of PC1 510. After a throughput set is measured by logic analyzer 530, analysis program 550 grabs that throughput set data from logic analyzer 530.

Figure 3:
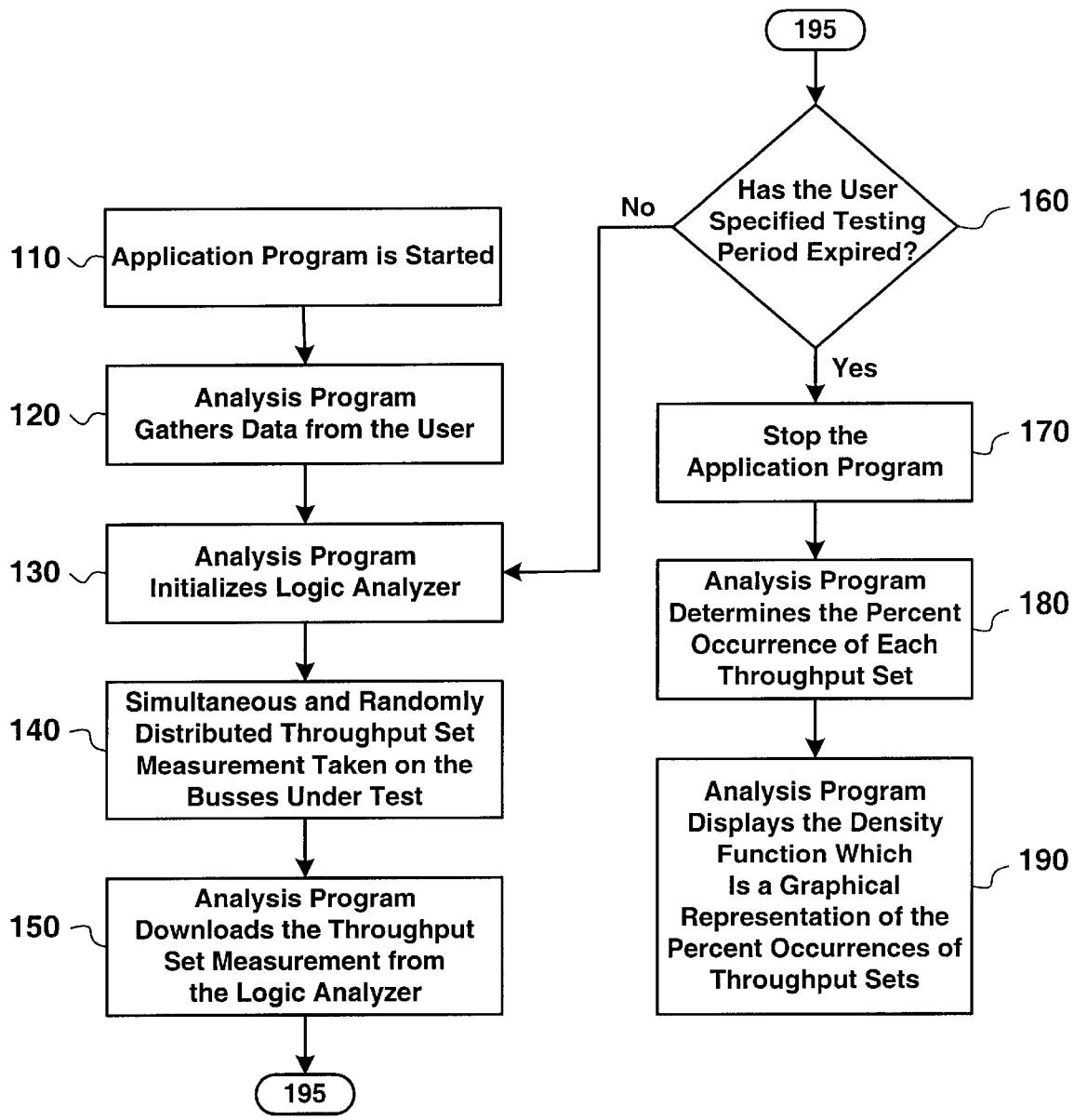
FIG. 3 is a flowchart illustrating the sequence of steps required to display a density function for a particular application program.

FIG. 3 is a flow chart illustrating a method used to display a density function according to an embodiment of the present invention. Referring to FIG. 3, in step 110, an application program 540, which resides on PC1 510, is started. In step 120, an analysis program 550 gathers data from the user such as the busses whose throughputs will be measured (i.e. the busses under test) and the testing period. The user inputs these values using an input device such as keyboard 14. In step 130, analysis program 550 running on PC2 520 initializes logic analyzer 530 by clearing its trace memory.

The time period between successive throughput set measurements is not fixed but is rather at random intervals. In step 140, randomly distributed throughput set measurements are achieved by having analysis program 550, while application program 540 is running, direct logic analyzer 530, at random intervals, to simultaneously measure throughputs on the busses of PC1 510 under test. Randomly distributed measurements greatly increase the probability that representative samples will be taken. Randomly distributed measurements also allow the characteristics of long runtime applications to be plotted without having to create a large, unwieldy trace.

In step 150, after a throughput set has been measured, analysis program 550 downloads that throughput set from logic analyzer 530 and stores this value in a data store on a device such as system memory 2 or disk drive 12. In step 160, analysis program 550 determines if the testing period has expired. The testing period is specified by the user and can last for a specific time period or for a specific memory length. If the user specifies taking measurements for a specific memory length, measurements are taken until that amount of memory is occupied by throughput set measurements. If the user specified testing period has not expired then more throughput sets are measured in a similar manner by returning to step 130.

After the testing period expires, in step 170, application program 540 is stopped. In step 180, the percent occurrence of each throughput set is calculated. Analysis program 550 fetches the stored throughput sets and counts the number of occurrences of each throughput set. The counting may be accomplished by using counters, each counter corresponding to one of the distinct throughput sets encountered. As a throughput set is encountered, its corresponding counter is incremented. Another counter counts the total number of throughput sets measured. The percent occurrence as used herein, refers to the percentage of times that a certain throughput set occurred. Analysis program 550 divides the number of occurrences of each throughput set by the total number of throughput sets measured to calculate the percent occurrence of each throughput set.

In step 190, the percent occurrences of throughput sets are graphically displayed as a density function. Each axis of the graph corresponds to a bus on which throughputs were measured. For each throughput set, the percent occurrence of that throughput set may be graphed using a color scheme where in general, lighter colors represent a low percent occurrence of the throughput set and darker colors represent a high percent occurrence of the throughput set. Specifically, in this embodiment, the color green denotes zero percent occurrence of the throughput set on the measured busses. The color light yellow denotes 0% to 0.5% occurrence of the throughput set. The color dark yellow denotes 0.5% to 1.0% occurrence of the throughput set. In general, each color gradient represents a 0.5% increase or decrease in the percent occurrence of the throughput set. In this embodiment, the coloring scheme for throughput occurrences, from least occurrence to higher occurrence is: green (represents zero percent occurrence), light yellow, dark yellow, light orange, dark orange, light red, dark red, violet, indigo, blue, etc.

Figure 4:
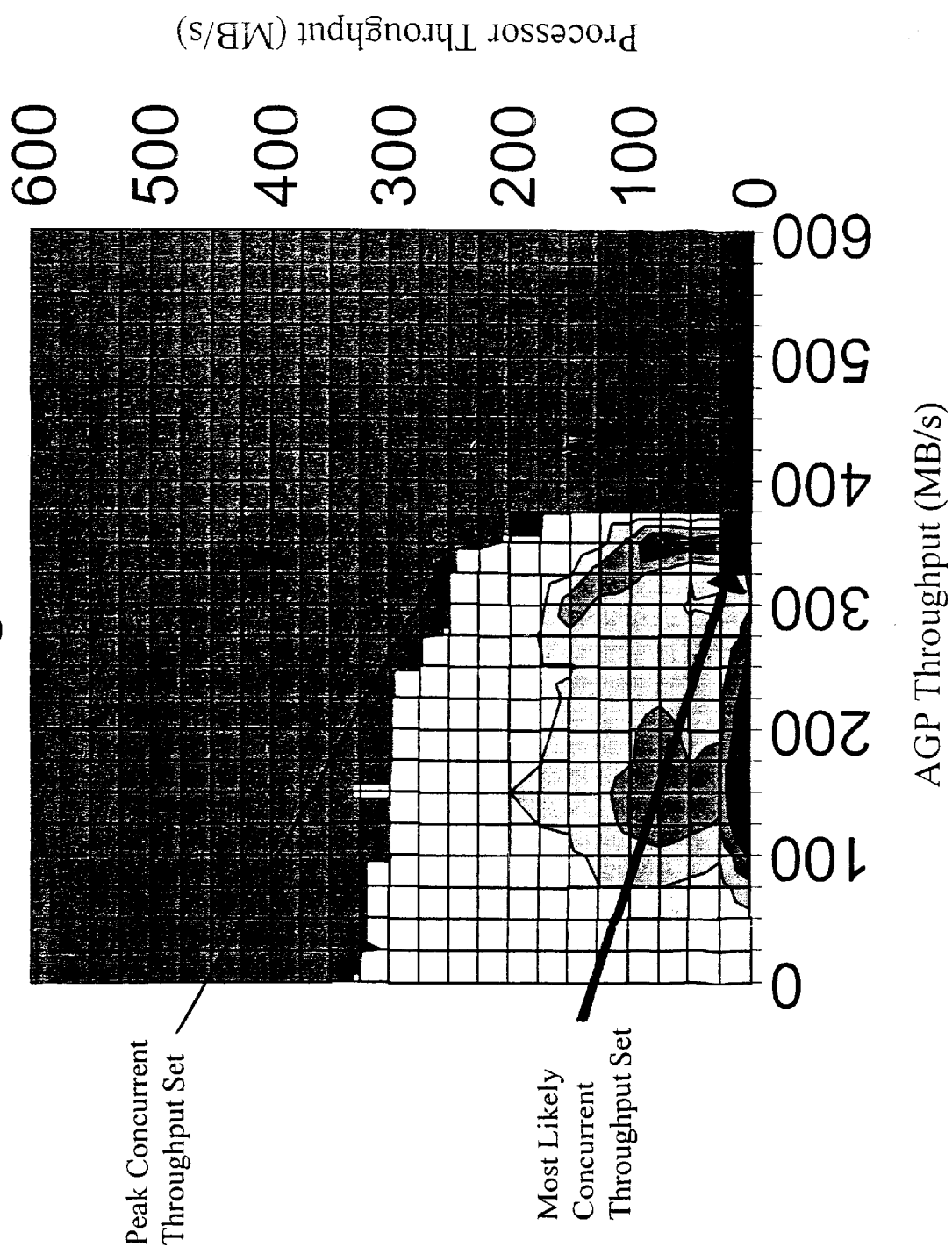
FIG. 4 illustrates the density function for a typical application where the throughputs on the AGP and the processor bus are simultaneously displayed.

FIG. 4 is an example of the image output on display 9 when an application is executing on a computer and the busses under test are AGP 6 and processor bus 3. The graph has varying colors where different colors represent different percent occurrences of throughput sets. Darker colors represent higher percent occurrences of the throughput sets than lighter colors which represent lower percent occurrences of the throughput sets. Each color gradient represents a 0.5% increase or decrease in the percent occurrences of the throughput sets. The most likely concurrent throughput set across the measured busses is the darkest colored region in FIG. 4. The most likely concurrent throughput set is specifically shown in FIG. 4.

The peak concurrent throughput set is the point on the density function having the largest throughput value when the throughputs on measured busses are added together. The peak concurrent throughput set is specifically shown in FIG. 4. The peak throughput on a single bus is the largest throughput measurement taken on that bus.

For example, to illustrate the peak concurrent throughput set and the peak throughput on a single bus, assume that two simultaneous measurements are taken on AGP 6 and processor bus 3 having the following values: AGP1=300 MB/s and processor bus1=300 MB/s; AGP2=400 MB/s and processor bus2=100 MB/s. The peak concurrent throughput set for the application program occurred when the AGP throughput was 300 MB/s and the processor bus throughput was 300 MB/s because the combined throughput of 600 MB/s for the first throughput set is greater than the combined throughput of 500 MB/s for the second throughput set. The peak throughput on AGP 6 occurred during the second measurement where the measured AGP throughput was 400 MB/s. The peak throughput on processor bus 3 occurred during the first measurement where the measured processor bus throughput was 300 MB/s.

In an alternative embodiment, analysis program 550 calculates the most likely throughput on only one of the measured busses. This involves, first, setting up counters, one for each of the distinct throughput measurements taken on that one bus. Then, analysis program 550 traverses through the measurements. For each throughput measurement encountered, analysis program 550 increments the counter corresponding to that measurement. Analysis program 550 can then scan the counters to find the counter with the highest value and thus the most likely throughput on that one bus.

In another embodiment, analysis program 550 calculates the average concurrent throughput on the busses under test and also the average throughput on a single bus. Calculating the average throughput is useful for determining whether a certain application sustains a certain throughput to the detriment of a device and also to ensure that application programs efficiently use busses. For example, if the system memory is known to overload at 500 MB/s and the average concurrent throughput for a certain application is 550 MB/s then damage to the system memory will most likely occur by running the application.

The average concurrent throughput is calculated by multiplying the percent occurrence of the throughput set with the addition of the throughput measurements in the throughput set and doing this for each distinct throughput set and then adding the results of these calculations. The average throughput for only one of the measured busses is calculated by multiplying the percent occurrence of the throughput set by the throughput measured on that bus and performing this calculation for each distinct throughput set and then adding the results of these calculations.

For example, assume that three measurements are taken on AGP 6 and processor bus 3 having the following values: AGP1=25 MB/s, processor bus1=25 MB/s; AGP2=50 MB/s, processor bus2=0; AGP3=25 MB/s, processor bus3=25 MB/s. The average concurrent throughput is: 67%(25 MB/s+25 MB/s)+33%(0+50 MB/s)=50 MB/s. The average throughput on AGP 6 is: 67%(25 MB/s)+33%(50 MB/s)= 33.33 MB/s.

Other embodiments may measure any of the system busses such as system memory bus 11; measurements are not limited to only occurring on AGP 6, processor bus 3, or PCI bus 4. Rather than the throughput, other embodiments may measure a different internal signal on the motherboard such as bus utilization which is the number of clocks the bus was used divided by the total number of clocks.

Other embodiments for displaying the density function of an application include using a single PC which executes both application program 540 and analysis program 550. First, application program 540 is started. Analysis program 550 then directs, depending on the busses involved in the test, the appropriate device drivers to measure throughput sets across processor bus 3, AGP 6, PCI bus 4, or system memory bus 11. The device drivers are programs that operate the hardware and are called upon by application programs or the operating system. The device drivers measure the throughputs on the various busses using performance counters which may be built into certain chipsets.

After analysis program 550 instructs the device drivers to begin measuring throughput sets at randomly distributed intervals, analysis program 550 goes into a sleep mode. The device drivers store the throughput sets in system memory 2. After the testing period expires and measurements are no longer taken, analysis program 550 gathers the throughput sets from system memory 2 and as described earlier, displays the percent occurrences of the throughput sets.

Other embodiments include displaying a histogram of the percent occurrence of each throughput set. This invention is not limited to displaying the percent occurrences of throughput sets using the previously mentioned coloring scheme.

III. Displaying the Throughputs from a Chipset Given External User Specified Stimuli System memory 2 can only serve so many requests at a time. The paths through chipset 5 are also constrained because chipset 5 can only service a limited number of requests at a time. Inherent latencies in chipset 5, such as the time needed to schedule requests, appear when requests to chipset 5 occur at extremely high rates. Measuring throughputs from chipset 5 when having such extremely high request rates serve as an accurate indicator of that chipset's efficiency.

Figure 5:
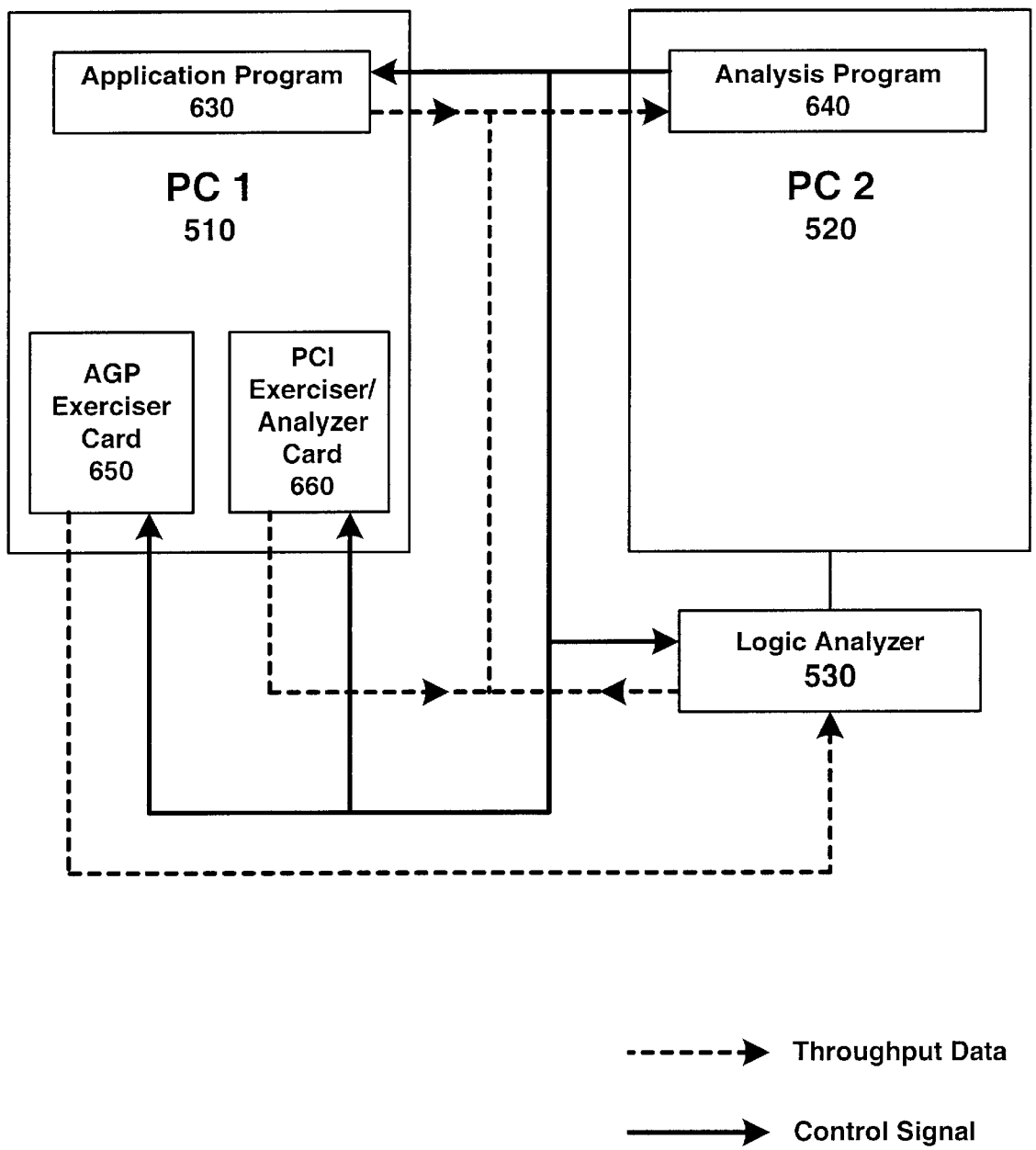
FIG. 5 is a block diagram illustrating the setup required to display concurrency plots given that user specified stimuli are input into one or more busses under test.

FIG. 5 is an example of an embodiment for a setup to simultaneously display the throughputs on the busses under test granted that throughputs are simultaneously measured on those busses and granted that a user specified stimuli are input into those busses. In this embodiment, the busses that can be measured are AGP 6, PCI bus 4, and processor bus 3.

The device under test, a first computer system, PC1 510, is running an application program 630 which generates the stimulus for processor bus 3 and also measures the throughputs on that bus. A second computer system, PC2 520, has an analysis program 640 executing on it. Analysis program 640 collects input data from the user, coordinates the stimuli sent to the chipset of PC1 510 on the busses under test, coordinates measuring the throughput sets (simultaneous throughput measurements on the busses under test), and displays the concurrency plots for the measured throughput sets. Logic analyzer 530 is attached to PC2 520. The probes of logic analyzer 530 are attached to AGP 6 of PC1 510. Logic analyzer 530 is used to collect throughput measurements on AGP 6 of PC1 510. After logic analyzer 530 collects a throughput measurement, that measurement is then downloaded from the logic analyzer to PC2 520.

An AGP exerciser card 650 is connected to AGP 6 of PC1 510. AGP exerciser card 650 is used to generate the stimulus for AGP 6. A PCI exerciser/analyzer card 660 is connected to PC1 510. PCI exerciser/analyzer card 660, such as the Hewlett Packard® 2925A card, is used to generate the stimulus for PCI bus 4 of PC1 510 and also used to measure throughputs on that bus.

With regards to the control and throughput data signals in FIG. 5, analysis program 640 sends control signals to logic analyzer 530, AGP exerciser card 650, and PCI exerciser/analyzer card 660 in order to initialize those devices. It also sends control signals to application program 630, AGP exerciser card 650, or PCI exerciser/analyzer card 660 in order to direct the appropriate devices to generate the user specified amount and type of stimuli to the appropriate busses. Control signals are also sent to application program 630, logic analyzer 530, or PCI exerciser/analyzer card 660 in order to direct the appropriate devices to start or stop taking measurements. Analysis program 640 fetches throughput measurement data from logic analyzer 530, PCI exerciser/analyzer card 660, and application program 630. Throughput measurement data also travels from AGP exerciser card 650 to logic analyzer 530 because logic analyzer 530 is used to measure throughputs on AGP 6.

Figure 6:
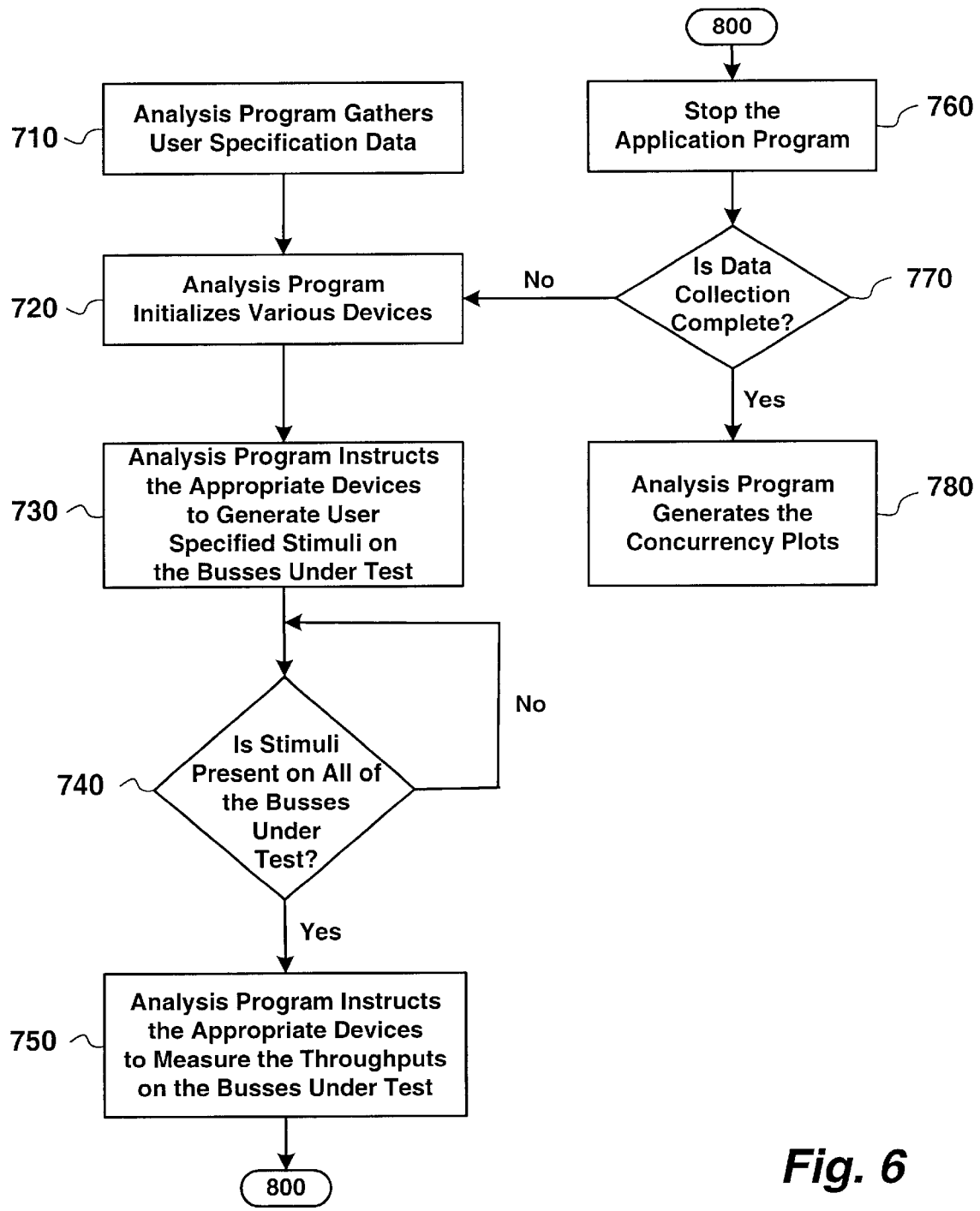
FIG. 6 is a flowchart illustrating the sequence of steps required to display concurrency plots given that user specified stimuli are input into one or more busses under test.

FIG. 6 is a flow chart illustrating a method to simultaneously display the throughputs 201 on one or more busses under test given that those busses are stressed by user specified stimuli. FIG. 6 illustrates an embodiment of the present invention. Referring to FIG. 6, in step 710, analysis program 640 running on PC2 520 gathers data from the user such as the busses involved in the test (the busses that will receive input stimuli), the transaction type of the input stimuli (is the stimuli read or write operations), burst size (length of data to be transferred), the throughput intensity level (heavy load versus light load), source agent, and sink agent. The source agent and the sink agent allow the user to specify where the stimuli is initiated and the resource targeted by that stimuli. For example, the user can specify that processor bus 3 generates writes to PCI bus 4. In that case, processor bus 3 would be the source agent and PCI bus 4 would be the sink agent. By allowing the user to vary the stimuli input into the busses, an accurate measurement can be obtained of the chipset's ability to maintain multiple high throughputs of a known transaction type to various resources such as system memory 2.

In step 720, analysis program 640 initializes logic analyzer 530 by clearing its trace memory, initializes AGP exerciser card 650, and initializes PCI exerciser/analyzer card 660 by clearing its trace memory. In step 730, analysis program 640, depending on the busses involved in the test, instructs application program 630, AGP exerciser card 650, or PCI exerciser/analyzer card 660 to generate the user specified amount and type of stimuli on the appropriate busses. Upon each iteration, minor changes are made to the stimuli, changes such as the rate of flow of the stimuli.

In step 740, analysis program 640 checks to make sure that stimuli are present on the busses under test. Stimuli must be present on all of the busses under test before taking any throughput measurements. After stimuli are present on all the busses under test, in step 750, analysis program 640 then directs, depending on the busses involved in the test, application program 630, logic analyzer 530, or PCI exerciser/analyzer card 660 to measure the throughputs on the appropriate busses. These throughput measurements on the busses under test are taken simultaneously. Logic analyzer 530 and PCI exerciser/analyzer card 660 store the throughput measurements as traces in the internal RAM of the two devices. Application program 630 stores the throughput measurements in the system memory 2 of PC1 510.

In step 760, analysis program 640, depending on the busses involved in the test, gathers the throughput measurements (a simultaneous throughput measurement on all the busses under test together make up a throughput set) from logic analyzer 530, PCI exerciser/analyzer card 660, or application program 630. These throughput measurements are stored in a data store on a device such as system memory 2. In step 770, analysis program 640 determines whether data collection is complete. Data collection is complete when all of the input stimulus for each bus under test is completely transmitted to that bus. If processor bus 3 is involved in the test, data collection is complete when analysis program 640 receives from application program 630 an indication that it is done transmitting the user specified stimulus to processor bus 3. If data collection is not complete then another throughput set is measured by returning to step 720. The time period between measurements has been encoded in analysis program 640. The above process for collecting throughput sets is performed for each different transaction type.

In step 780, after data collection completes, analysis program 640 fetches the throughput sets from the data store and generates the concurrency plots. Each axis of the graph corresponds to a bus on which throughput measurements were taken during the testing period. Each data point in the concurrency plot corresponds to a throughput set which was simultaneously measured on the busses under test. Analysis program 640 keeps track of whether the throughput set was measured while the input stimuli to the busses were a read or write transaction type. In this embodiment where throughput measurements are taken on two different busses, many different concurrency plots can be displayed, the number dependent on the number of different transaction types specified by the user for the input stimuli.

After the throughput sets are grouped by transaction type, the sets are graphed to create the concurrency plots. For example, if the input stimuli to the busses consist of read transaction types, and the throughput measurements have the value 40 MB/s on PCI bus 4 and 580 MB/s on processor bus 3, the data point on the concurrency plot is where the throughput on the axis corresponding to PCI bus 4 equals 40 MB/s and the throughput on the axis corresponding to processor bus 3 equals 580 MB/s. All the throughput sets are graphed on the concurrency plot in a similar manner. A line is then drawn between the data points of each transaction type.

Figure 7:
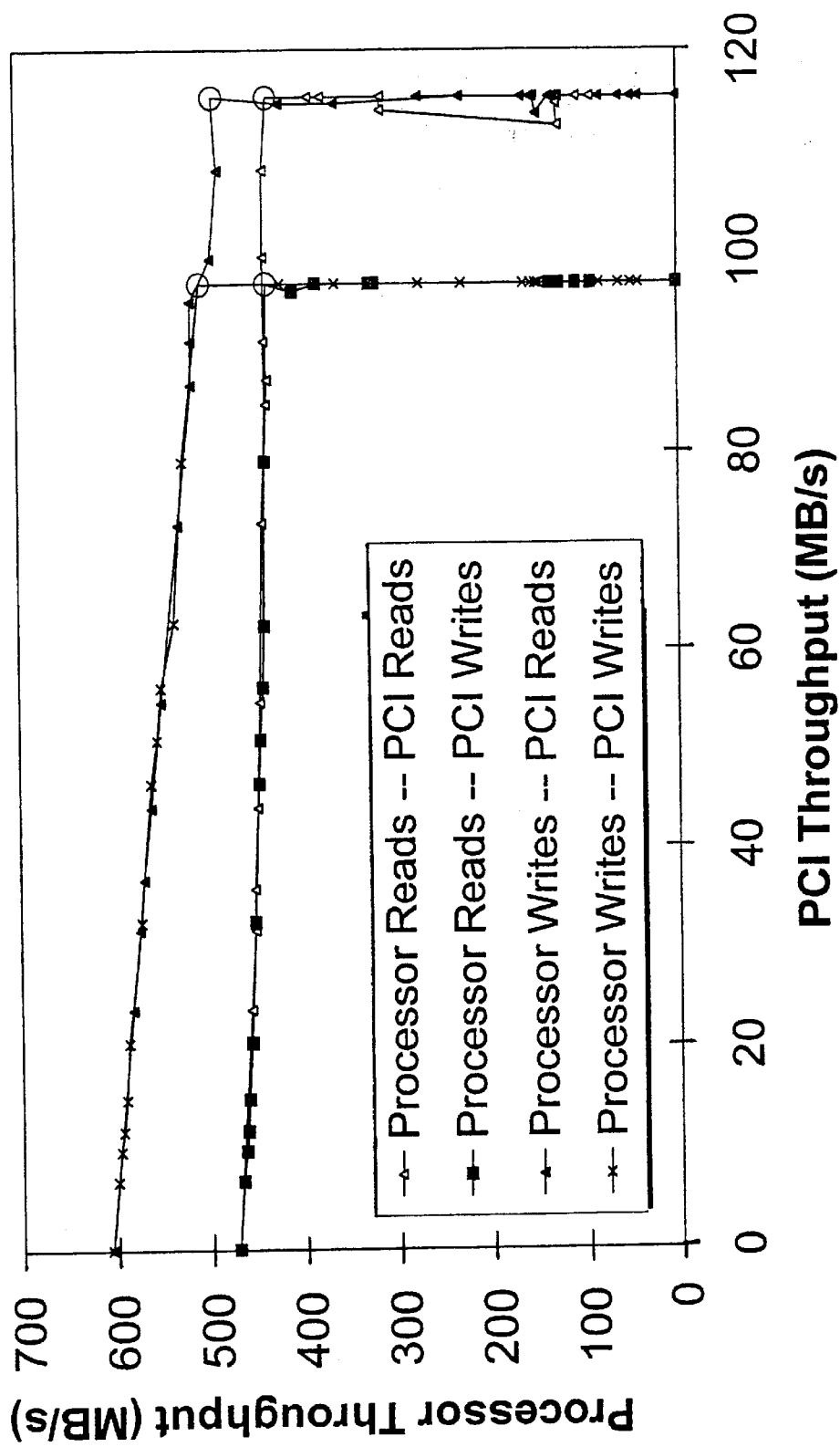
FIG. 7 illustrates the concurrency plots for the PCI bus and the processor bus given that user specified stimuli are input into those busses.

FIG. 7 illustrates several concurrency plots in which throughput sets are measured on PCI bus 4 and processor bus 3 according to this embodiment. The concurrency plots represent the simultaneous throughputs achieved by PCI bus 4 and processor bus 3 when both are generating accesses to system memory 2. The four different concurrency plots in FIG. 7 represent the various transaction types that the user can specify as input stimuli to the busses under test (in this example, the PCI bus and the processor bus are the busses under test). The concurrency plot consisting of "-Δ-" represents throughput sets where reads are the transaction type sent as input stimuli on both the busses under test. The concurrency plot consisting of "-■-" represents throughput sets where reads are the transaction type sent as input stimulus to the first bus and writes are the transaction type sent as input stimulus to the second bus. The concurrency plot consisting of "-▲-" represents throughput sets where writes are the transaction type sent as input stimulus to the first bus and reads are the transaction type sent as input stimulus to the second bus. The concurrency plot consisting of "-<>-" represents throughput sets where writes are the transaction type sent as input stimuli to both busses.

The points lying on each axis represent throughput measurements taken with only one of the two busses active. On these axis points, stimulus is not being generated on one of the busses under test thus the corresponding throughput value on that axis is zero. A circled point on a concurrency plot represents the throughputs achieved when the busses under test are generating transactions at the maximum rate. Specifically, in FIG. 7, the circled point represents the throughputs provided by the chipset on processor bus 3 and PCI bus 4 where processor bus 3 requests accesses from system memory 2 at the maximum possible rate and PCI bus 4 requests accesses from system memory 2 at the maximum possible rate.

Referring to FIG. 7, the data points are generated by sending the maximum amount of stimulus to processor bus 3 while no stimulus is sent to PCI bus 4. At later points in the test, the stimulus sent to processor bus 3 stays at the maximum rate, while the stimulus to PCI bus 4 is increased until eventually that stimulus becomes the maximum amount that PCI bus 4 can handle. As stated earlier, the circled point is where PCI bus 4 and processor bus 3 are generating requests at the maximum rate. After this point, PCI bus 4 continues to make requests at the maximum rate while the request rate from processor bus 3 decreases at discrete user specified intervals until eventually, processor bus 3 makes no requests.

Concurrency plots such as those in FIG. 7 can be used, for among other purposes, to describe the performance envelope of chipset 5. Chipset 5 can perform at any point under the curves. Throughputs outside the curve are not sustainable. The throughputs generated by an application program should be below the concurrency plots.

Alternative embodiments include measuring more than two busses simultaneously and displaying the throughputs on those busses. This invention is not limited to generating user specified stimuli or measuring throughputs on only AGP 6, processor bus 3, or PCI bus 4, but rather this invention can be used for any system bus. Alternative embodiments include measuring throughputs using counters in software rather than using PCI exerciser/analyzer card 660 to measure throughputs on PCI bus 4 and using logic analyzer 530 to measure throughputs on AGP 6.

Several embodiments of the present invention are illustrated or described herein. However, it will be appreciated that modifications and variations of the present invention are covered by the above teachings and are within the purview of the appended claims without departing from the spirit and intended scope of the invention.

In addition, several definitions are provided above but it will be appreciated that these definitions are not meant to be limiting but are rather provided for context purposes and that among others, the general definition, as understood by those skilled in the art, also applies.

What is claimed is:

1. A method for displaying a density function comprising:
   inputting user specified stimuli on a set of busses under test;
   measuring simultaneously and at randomly distributed intervals a plurality of signal sets on the set of busses under test;
   analyzing the signal sets to determine a plurality of percent occurrences corresponding to the signal sets; and
   displaying the percent occurrences corresponding to the signal sets in a graph.

2. The method of claim 1 wherein the signal sets are a plurality of throughput sets, each throughput set including at least a set of throughput measurements.

3. The method of claim 2 further comprising, on the occurrence of each of the throughput sets, incrementing a certain one of a set of first counters where each of the first counters corresponds to a distinct one of the throughput sets.

4. The method of claim 3 further comprising incrementing a second counter upon measuring each of the throughput sets.

5. The method of claim 4 further comprising dividing each of the first counters by the second counter to determine a corresponding one of the percent occurrences for each of the throughput sets.

6. The method of claim 5 wherein the graph includes at least a set of axes, each of the axes corresponding to one of the busses under test.

7. The method of claim 6 wherein the graph includes at least a set of colors and a change in color represents a change in the percent occurrences of the throughput sets.

8. The method of claim 7 wherein darker colors in the graph represent higher percent occurrences of the throughput sets than lighter colors in the graph.

9. A method for displaying a concurrency plot comprising:
   generating a set of user specified stimuli on a set of busses under test;
   simultaneously measuring a plurality of signal sets on the busses under test;
   analyzing the signal sets based on a transaction type; and
   displaying the signal sets in a graph.

10. The method of claim 9 wherein the signal sets are a plurality of throughput sets, each throughput set including at least a set of throughput measurements.

11. The method of claim 10 wherein the user specified stimuli is generated according to a user's specification for the transaction type, a burst size, an intensity level, a source agent, and a sink agent.

12. The method of claim 11 wherein the graph includes at least a set of axes, each of the axes corresponding to one of the busses under test.

13. The method of claim 12 wherein the throughput sets correspond to a plurality of data points on the graph.

14. The method of claim 13 further comprising inserting a marker in the graph to indicate that the busses under test are operating at a maximum capacity.

15. A computer system to display a density function comprising:
   a first computer;
   an application program residing on and executed by the first computer;
   a set of busses under test on the first computer; and
   an analysis program, wherein during execution, the analysis program simultaneously and at randomly distributed intervals measures a plurality of signal sets on the busses under test, from user specified stimuli input into the busses under test, while the application program is executing on the first computer, and after analyzing the signal sets to determine a plurality of percent occurrences corresponding to the signal sets, the analysis program displays the percent occurrences in a graph.

16. The system of claim 15 wherein the signal sets are a plurality of throughput sets, each throughput set including at least a set of throughput measurements.

17. The system of claim 16 wherein the analysis program resides on a second computer.

18. The system of claim 17 wherein a logic analyzer measures the throughput sets.

19. A computer system to(display a concurrency plot comprising:
   a first computer;
   an application program residing on and executed by the first computer;
   a set of busses under test on the first computer;
   a set of user specified stimuli inputted into the busses under test; and
   an analysis program, wherein during execution, the analysis program simultaneously measures a plurality of signal sets on the busses under test given the user specified stimuli input into the busses under test, and after analyzing the signal sets based on a transaction type, displays the signal sets in a graph.

20. The system of claim 19 wherein the signal sets are a plurality of throughput sets, each throughput set including at least a set of throughput measurements.

21. The system of claim 20 wherein a PCI exerciser/analyzer card generates one of the user specified stimuli on a PCI bus and measures on the PCI bus one of the throughput measurements of the throughput sets.

22. The system of claim 20 wherein an AGP exerciser card generates one of the user specified stimuli on an AGP.

23. The system of claim 20 wherein the application program generates one of the user specified stimuli on the processor bus and measures on the processor bus one of the throughput measurements of the throughput sets.

24. The system of claim 20 wherein a logic analyzer measures on the AGP one of the throughput measurements of the throughput sets .

25. The system of claim 24 wherein the analysis program resides on a second computer.

26. A machine-readable medium having stored thereon data representing sequences of instructions, the sequences of instructions including sequence of instructions which, when executed by a processor, cause the processor to perform the steps of:
   inputting user specified stimuli on a set of busses under test;

measuring simultaneously and at randomly distributed intervals a plurality of signal sets on the set of busses under test;

analyzing the signal sets to determine a plurality of percent occurrences corresponding to the signal sets; and displaying the percent occurrences corresponding to the signal sets in a graph.

27. A machine-readable medium having stored thereon data representing sequences of instructions, the sequences of instructions including sequence of instructions which, when executed by a processor, cause the processor to perform the steps of:

generating a set of user specified stimuli on a set of busses under test;

simultaneously measuring a plurality of signal sets on the busses under test;

analyzing the signal sets based on a transaction type; and displaying the signal sets in a graph.

* * * * *